US011940956B2

(12) United States Patent
Butt

(10) Patent No.: US 11,940,956 B2
(45) Date of Patent: Mar. 26, 2024

(54) CONTAINER INDEX PERSISTENT ITEM TAGS

(71) Applicant: John Butt, Bristol (GB)

(72) Inventor: John Butt, Bristol (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 995 days.

(21) Appl. No.: 16/372,675

(22) Filed: Apr. 2, 2019

(65) Prior Publication Data

US 2020/0320040 A1 Oct. 8, 2020

(51) Int. Cl.
*G06F 16/17* (2019.01)
*G06F 3/06* (2006.01)
*G06F 16/13* (2019.01)
*G06F 16/174* (2019.01)

(52) U.S. Cl.
CPC ........ *G06F 16/1752* (2019.01); *G06F 3/0608* (2013.01); *G06F 3/0622* (2013.01); *G06F 3/0641* (2013.01); *G06F 3/0683* (2013.01); *G06F 16/13* (2019.01)

(58) Field of Classification Search
CPC .... G06F 16/1752; G06F 16/16; G06F 3/0608; G06F 3/0622; G06F 3/0641; G06F 3/0683; G06F 16/13; G06F 2201/815; G06F 2201/83; G06F 11/1453; G06F 3/062; G06F 3/0638; G06F 3/064; G06F 3/0671; G06F 16/1748; G06F 11/1484
See application file for complete search history.

(56) References Cited

U.S. PATENT DOCUMENTS

| 2,441,002 | A | 5/1948 | Berglund |
| 7,107,298 | B2* | 9/2006 | Prahlad ............... H04L 61/4523 |
| | | | 707/673 |
| 7,519,635 | B1 | 4/2009 | Haustein et al. |
| 8,650,228 | B2 | 2/2014 | Wideman et al. |
| 9,171,008 | B2 | 10/2015 | Prahlad |
| 9,405,764 | B1 | 8/2016 | Wallace |
| 2008/0013830 | A1 | 1/2008 | Patterson et al. |
| 2009/0132619 | A1 | 5/2009 | Arakawa et al. |
| 2009/0259701 | A1 | 10/2009 | Wideman et al. |

(Continued)

FOREIGN PATENT DOCUMENTS

EP 2441002 B1 4/2013

OTHER PUBLICATIONS

International Preliminary Report on Patentability received in PCT Application No. PCT/US2014/039903, dated Dec. 8, 2016, 11 pages.

(Continued)

*Primary Examiner* — Hosain T Alam
*Assistant Examiner* — Cecile H Vo
(74) *Attorney, Agent, or Firm* — Trop, Pruner & Hu, P.C.

(57) ABSTRACT

Examples may include container index persistent item tags. Examples may store chunk signatures in at least one container index and, for each chunk signature, store at least one persistent item tag identifying a respective backup item that references or formerly referenced the chunk signature. Examples may determine that all chunks formerly referenced by a backup item have been erased based on the persistent item tags in the at least one container index and output an indication that the backup item has been erased.

19 Claims, 6 Drawing Sheets

(56) References Cited

U.S. PATENT DOCUMENTS

| | | | |
|---|---|---|---|
| 2012/0084269 A1 | 4/2012 | Vijayan et al. | |
| 2012/0159098 A1 | 6/2012 | Cheung et al. | |
| 2012/0166403 A1 | 6/2012 | Kim | |
| 2012/0173558 A1 | 7/2012 | Sorenson | |
| 2012/0209814 A1 | 8/2012 | Zhang et al. | |
| 2013/0054545 A1* | 2/2013 | Anglin | G06F 16/174 707/693 |
| 2015/0261792 A1* | 9/2015 | Attarde | G06F 16/215 707/616 |
| 2016/0371308 A1 | 12/2016 | Akirav | |
| 2017/0046093 A1 | 2/2017 | Butt | |
| 2017/0277597 A1* | 9/2017 | Dillon | G06F 11/1453 |
| 2019/0004960 A1* | 1/2019 | Wang | G06F 12/0871 |

OTHER PUBLICATIONS

International Search Report & Written Opinion received in PCT Application No. PCT/US2014/039903, dated Feb. 25, 2015, 14 pages.

Srinivasan et al., "Idedup: Latency-aware, Inline Data Deduplication For Primary Storage", NetApp, Inc., Feb. 10, 2012, pp. 1-14.

Wu et al, "A Data De-duplication Access Framework for Solid State Drives", Journal Of Information Science And Engineering 28, 2012, pp. 941-954.

Ashwin Shetty, "Secure your data with HP StoreOnce," Nov. 2, 2014, <https://community.hpe.com/15/Around-the-Storage-Block/Secure-your-data-with-HP-StoreOnce/ba-p/6794711#.XJpZgphKiUl>.

Fabiano Botelho, "Memory Efficient Sanitization of a Deduplicated Storage System," 2013, <https://www.usenix.org/system/files/conference/fast13/fast13-final100_0.pdf>.

Hewlett Packard Enterprise Development LP, "HPE StoreOnce Data Protection Backup Appliance Overview," Oct. 2017, <https://h20195.www2.hpe.com/V2/GetPDF.aspx/a00029785enw.pdf>.

Hewlett Packard Enterprise Development LP, "HPE StoreOnce 3620, 3640, 5200, 5250, and 5650 Systems User Guide For StoreOnce software version 4.1.1," Dec. 2018, Edition 2, <https://support.hpe.com/hpsc/doc/public/display?sp4ts.oid=1011205970&docLocale=en_US&docId=emr_na-a00062048en_us&withFrame>.

Hewlett Packard Enterprise Development LP, "HPE StoreOnce Systems," Mar. 4, 2019, QuickSpecs, <https://h20195.www2.hpe.com/v2/GetPDF.aspx/c04328820.pdf>.

Hewlett Packard Enterprise Development LP, "StoreOnce 3100, 3520, 3540, 5100, and 5500 User Guide," Mar. 2016, Edition 2, <http://h20628.www2.hp.com/km-ext/kmcsdirect/emr_na-c05063428-1.pdf>.

* cited by examiner

| CONTAINER INDEX 150 | CHUNK SIG | SEC FLAG | PERSISTENT ITEM TAG | REF COUNT | LOC DATA | |
|---|---|---|---|---|---|---|
| | SIG-1 | T | BI-11, BI-12 | 1 | LOC 251 | ~151 |
| | SIG-2 | T | BI-13 | 1 | LOC 252 | ~152 |
| | SIG-3 | F | BI-10 | 1 | LOC 253 | ~153 |
| | SIG-4 | T | BI-12 | 0 | LOC 254 | ~154 |
| | SIG-5 | T | BI-13 | 1 | LOC 255 | ~155 |

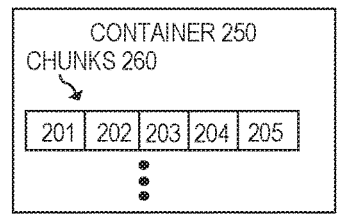

*FIG. 1B*

| CONTAINER INDEX 150 | CHUNK SIG | SEC FLAG | PERSISTENT ITEM TAG | REF COUNT | LOC DATA | |
|---|---|---|---|---|---|---|
| | SIG-1 | T | BI-11, BI-12 | 1 | LOC 251 | ~151 |
| | SIG-2 | T | BI-13 | 1 | LOC 252 | ~152 |
| | SIG-3 | F | BI-10 | 1 | LOC 253 | ~153 |
| | SIG-5 | T | BI-13 | 1 | LOC 255 | ~155 |

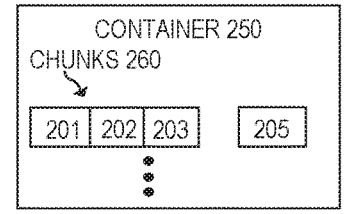

*FIG. 1C*

| CONTAINER INDEX 150 | CHUNK SIG | SEC FLAG | PERSISTENT ITEM TAG | REF COUNT | LOC DATA | |
|---|---|---|---|---|---|---|
| | SIG-1 | T | BI-11, BI-12 | 0 | LOC 251 | ~151 |
| | SIG-2 | T | BI-13 | 1 | LOC 252 | ~152 |
| | SIG-3 | F | BI-10 | 1 | LOC 253 | ~153 |
| | SIG-5 | T | BI-13 | 1 | LOC 255 | ~155 |

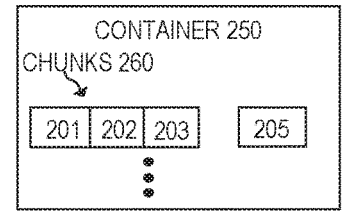

*FIG. 1D*

| CONTAINER INDEX 150 | CHUNK SIG | SEC FLAG | PERSISTENT ITEM TAG | REF COUNT | LOC DATA | |
|---|---|---|---|---|---|---|
| | SIG-2 | T | BI-13 | 1 | LOC 252 | ~152 |
| | SIG-3 | F | BI-10 | 1 | LOC 253 | ~153 |
| | SIG-5 | T | BI-13 | 1 | LOC 255 | ~155 |

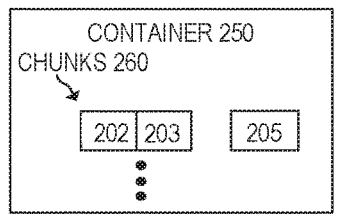

*FIG. 1E*

CONTAINER INDEX PERSISTENT ITEM TAGS

BACKGROUND

A client computing device, such as a host server or the like, may store data in a primary storage array, and may execute workloads against the data stored in the primary storage array. In some examples, the data stored in the primary storage array may be backed up in a backup appliance, separate from the client computing device and the primary storage array, for redundancy and data protection purposes, or the like. In some examples, the backup appliance may store data in a deduplicated form such that the data is stored more compactly than on the primary storage array.

BRIEF DESCRIPTION OF THE DRAWINGS

The following detailed description references the drawings, wherein:

FIGS. 1B-1E are block diagrams of the example container and container index of FIG. 1A at different points in time;

DETAILED DESCRIPTION

As noted above, a computing device (such as a host, server, storage array, etc.) may back up data by storing the data in a system able to perform deduplication on the data (a "deduplication system" herein) in order to store the data in a more compact, deduplicated form. In examples described herein, a process of deduplication performed by a deduplication system on a collection of data (referred to herein as a "stream" of data or a "data stream") may include dividing the stream into fixed or variable length sections referred to herein as "chunks", identifying "duplicate" chunks having content identical to that of other chunks, storing one (full or compressed) copy of each chunk not identified as being a duplicate of an already-stored chunk and, for duplicate chunks, storing references (e.g., pointers) to the stored copy of the chunk without storing the same chunk again. In this manner, a deduplication process may often avoid storing duplicates of the same chunk in a deduplication store. In such examples, the deduplication system may store a deduplicated representation of a data stream, the deduplicated representation comprising selected data chunks and sufficient metadata to reconstruct the full version of a data stream from the selected data chunks and the metadata.

Figure 1A:
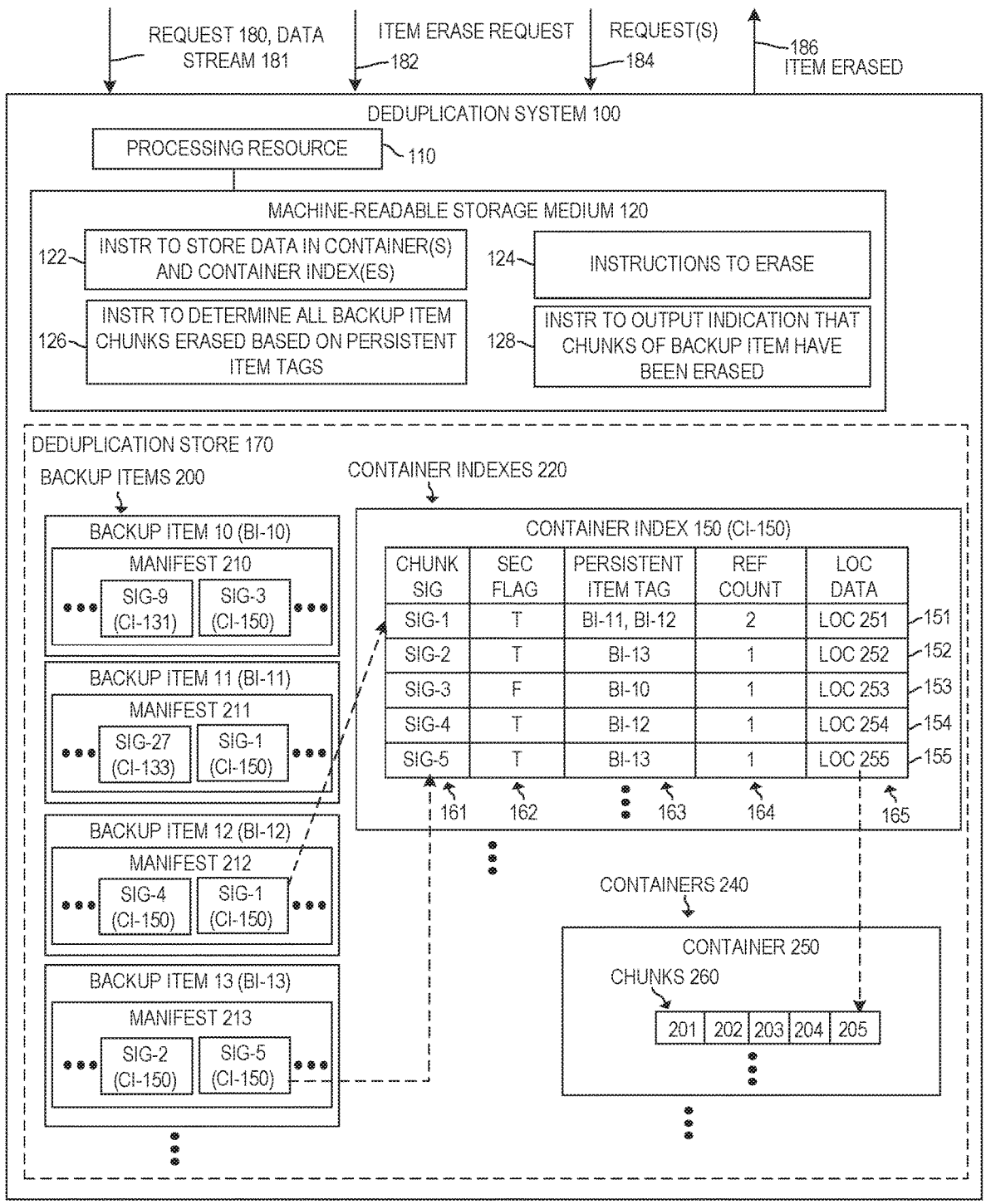
FIG. 1A is a block diagram of an example deduplication system to store persistent item tag(s) corresponding to chunk signature(s)

FIG. 1A is a block diagram of an example deduplication system 100, in accordance with examples described herein. Deduplication system 100 may implement one or more deduplication stores. In examples described herein, a "deduplication store" may be a logical domain in which a deduplication system may store data in a deduplicated form. In some examples, data stored to a particular deduplication store may be deduplicated in relation to (e.g., matched against) other data stored to the same deduplication store, and not in relation to data stored to any other deduplication store. FIG. 1A shows one example deduplication store 170 of deduplication system 100, although deduplication system 100 may implement any suitable number of deduplication stores.

A deduplication system, such as deduplication system 100, may store deduplicated representations of one or more streams of data using data structures including manifests, containers, and container indexes. Examples of these data structures will be described below in relation to an example data deduplication process of deduplication system 100. For example, deduplication system 100 may create a backup item 12 in deduplication store 170 to represent a data stream 181 in a deduplicated form. A data stream (and the backup item that represents it) may correspond to user object(s) (e.g., file(s), a file system, volume(s), or any other suitable collection of data). As it receives the original, non-deduplicated data stream 181, deduplication system 100 may divide data stream 181 into respective chunks of either a fixed size (e.g., approximately 4K) or a variable size and then, for each chunk, apply an appropriate signature function to the content of the chunk to obtain a chunk signature as a result for the chunk. In examples described herein, a "chunk signature" may be data representative of the content of a chunk derived by applying a signature function to the chunk. In some examples, the signature function may be a hash function, and the chunk signature may be a hash of the chunk generated by applying the hash function on the chunk. Any suitable hash function may be used to generate the chunk signature. In other examples, any other suitable type of signature function may be used in place of a hash function to generate an appropriate chunk signature (e.g., a function to generate a suitable type of fingerprint).

For each chunk of data stream 181, deduplication system 100 may store the chunk signature derived from the chunk in a manifest 212 of the backup item 12, such that manifest 212 includes a respective chunk signature for each of the chunks of the data stream 181 with the respective chunk signatures stored in the manifest 212 in the same order as the chunks themselves occur in the data stream 181. For each chunk of the data stream 181, the chunk signature for the chunk is used to determine whether a copy of that chunk is already stored in a container of the deduplication store 170 (i.e., whether the chunk is a duplicate of an already stored chunk).

In examples described herein, a container may be a logical entity (e.g., a file, etc.) in which chunks of data may be stored (e.g., in a full or compressed form). Each container may have a corresponding container index, which is an index of the chunks contained in the corresponding container. A container index (e.g., 150) includes one or more entries (e.g., 151, 152, etc.), each entry including data for a respective chunk in the container (e.g., 250) corresponding to the container index (e.g., 150). In examples described herein, each container index may include a respective entry for each chunk signature it contains and may include a respective chunk signature and entry for each chunk in the container corresponding to the container index. Each entry includes the chunk signature of a respective chunk, location data specifying the location of the respective chunk in the corresponding container (e.g., via an offset and length, or the like), and a reference count to indicate how many references to the chunk are made by the various manifests of the backup items of the deduplication store 170 (e.g., via the chunk signature for the chunk in the container index).

To determine whether a copy of a given chunk is already stored in a container of the deduplication store 170, the chunk signature for the given chunk may be compared against chunk signatures of at least one container index to find an identical chunk signature. For example, for a given chunk of data stream 181 for storage as backup item 12, if an identical chunk signature (e.g., SIG-3) is found in an existing container index (e.g., 150), then the chunk signatures may be considered a match, and the given chunk may not be added to any of the containers, as it would be a duplicate of the chunk (e.g., 203) corresponding to the identified identical chunk signature. Rather, the chunk signature for the given chunk (e.g., SIG-3) and an identifier of the container index including that chunk signature (e.g., CI-150) may be stored in manifest 212 to represent the copy of the given chunk that is already stored in a corresponding container (e.g., 250) at the location indicated by the location data in the container index.

However, if an identical chunk signature is not found for the chunk signature of the given chunk (e.g., because a copy of the given chunk is not currently stored in a container of deduplication store 170, or an identical chunk signature was not found in the particular container index(es) searched), then the given chunk is added to (e.g., stored in) a container of deduplication store 170 and a new entry is added to the container index corresponding to that container. In such examples, the added entry may include the chunk signature for the given chunk, location data for the chunk in the container to which it was added, and an initial reference count of 1 (since there will only be one reference to the corresponding chunk so far).

In such examples, some data or metadata of a deduplication system may be unique to a given backup item, such as the manifest of the given backup item, which is referenced or used exclusively by the given backup item. For example, as illustrated in FIG. 1A, deduplication system 100 may store manifest 212, which is unique to backup item 12 (i.e., no other backup item makes reference to manifest 212). Other data and metadata of a deduplication system may be shared by different backup items, such as the containers, chunks, and container indexes of a deduplication store, which may be referenced or used by many different backup items. For example, container 250 includes chunks referred to by each of backup items 10-13, and container index 150 is referred to by each of backup items 10-13.

In such examples, it may be difficult to determine when all data of a given backup item has been erased by the deduplication system. For example, while the data unique to the given backup item (such as its manifest) may be erased in response to a request to erase the given backup item, data that the given backup item shares with other backup item(s) (e.g., chunks referred to by multiple backup items) may not be erased in response to the request, as that would corrupt the other backup items.

In addition, even if such shared chunks are eventually erased at a later time (e.g., via the erasure of other backup item(s)), the deduplication system may not have any way to determine which backup items previously referenced those chunks, so the deduplication system may not be able to provide an indication that all data of a specific backup item has been erased at that later time. It may be desirable to know when all the data of a particular backup item has been completely erased from a deduplication system without completely erasing all data of the deduplication system (or a deduplication store thereof). For example, for a backup item containing sensitive data, it may be desirable to confirm that all of the data of that backup item has been erased, without the inefficiency of completely erasing all data of the deduplication system (or a deduplication store thereof).

This may be particularly desirable for data that is to be erased via a secure erase procedure (i.e., "securely erased") to help prevent later recovery or exposure of the data (e.g., when storage devices or systems are reused, redeployed, or the like). In such examples, a secure erase procedure may involve erasing data by repeatedly overwriting the data with one or more predefined data patterns (e.g., zeroes, ones, a pattern of zeroes and ones, combination thereof, etc.) before it is considered to be erased. Such repeated overwriting of the data (i.e., more than once) by a secure erase procedure may be more resource-intensive than other erasure techniques, such as flagging certain locations for reuse, or other techniques which do not actually overwrite the data repeatedly before considering the data to be erased. As such, it may be an inefficient use of resources to securely erase all data when it is only desired that certain backup items be securely erased. Further, for the sake of security of the data to be securely erased, it may be desirable to report that all data of a given backup item has been securely erased. However, as noted above, it may not be possible to securely erase shared chunks in response to a request to erase a given backup item, and even if such shared chunks are eventually securely erased at a later time (e.g., via the erasure of other backup item(s)), the deduplication system may not be able to determine which backup items previously referenced those chunks securely erased later, so the deduplication system may not be able to provide an indication that all data of a specific backup item has been securely erased at that later time.

To address these issues, examples described herein may store, in a container index, at least one persistent item tag 163 corresponding to each chunk signature, wherein each persistent item tag identifies a respective backup item of the deduplication store that references or formerly referenced that chunk signature. Based on the persistent item tags in the container index(es) of a deduplication store, such examples may determine that all chunks formerly referenced by a given backup item have been erased (e.g., securely erased), after requests to erase various backup items of the deduplication store. Such examples may, in response to the determination, output an indication that the given backup item has been erased (e.g., securely erased).

In this manner, examples described herein may, for example, enable a deduplication system to determine chunks were previously referenced back erased backup items and determine when all such chunks previously referenced by such a backup item have been erased. In this manner, examples described herein may be able to provide an indication that all data of a specific backup item has been erased once all shared chunks previously referenced by the backup item have been erased.

Examples described herein may also provide secure flag(s) 162 that may, for example, enable a deduplication system to flag certain chunks for secure erasure when erased, and may be used to flag some or all chunks referenced by a given backup item for secure erasure when they are erased. In this manner, examples described herein may enable the deduplication system to perform secure erasure exclusively on desired chunks, which may be more efficient than performing secure erasure on all chunks to ensure secure erasure of the desired chunks. In some examples described herein, the use of both secure flag(s) 162 and persistent item tag(s) 163 may also enable a deduplication system to determine when all chunks of a given backup item have been securely erased.

In the examples described herein, all functionalities described as performed by deduplication system 100 may be performed by instructions stored on machine-readable storage medium 120, of deduplication system 100, executed by at least one processing resource 110 of deduplication system 100.

FIG. 1A is a block diagram of an example deduplication system 110 to store persistent item tag(s) corresponding to chunk signature(s). In the example illustrated in FIG. 1A, deduplication system 100 may be implemented by a computing device (such as at least one storage array, backup appliance, or the like) comprising at least one processing resource 110 and at least one machine-readable storage medium 120 comprising (e.g., encoded with) at least storage instructions 122, 124, 126, and 128 that are executable by the at least one processing resource 110 of deduplication system 100 to implement functionalities described herein in relation to instructions 122, 124, 126, and 128.

Examples will be described below in relation to FIG. 1A and FIGS. 1B-1E, where FIGS. 1B-1E are block diagrams of the example container and container index of FIG. 1A at different points in time. In the example of FIG. 1A, deduplication system 100 may implement one or more deduplication stores, including a deduplication store 170, including backup items 200, container indexes 220, and containers 240.

In the example of FIG. 1A, instructions 122 (e.g., when executed by at least one processing resource 110) may store chunks 260 of data in container(s) 240 of deduplication store 170, and may store chunk signatures and chunk location data for each of the chunks in container index(es) 220 of deduplication store 170. In the example of FIG. 1A, instructions 122 may create container index 150 (of container indexes 220) and may store, in container index, a plurality of entries 151-155 including chunk signatures 161, secure flags 162, persistent item tags 163, reference counts 164, and location data 165. Each of the other container indexes of container indexes 220 may contain the same types of information as described herein in relation to container index 150.

In the example of FIG. 1, each entry of container index 150 may include a chunk signature 161 and other information that corresponds to the chunk signature of that entry and the chunk represented by that chunk signature. For example, entry 151 includes a chunk signature SIG-1 that represents a chunk 201 of container 250, and entry 151 also includes a secure flag ("T"), persistent item tags BI-11 and BI-12, a reference count of 2, and location data 251, each corresponding to the chunk signature SIG-1 of entry 151. For ease of illustration herein, chunk signatures are represented with reference symbols having a format of "SIG-X", where "SIG-" is a prefix indicating a chunk signature, and "X" is one or more numbers identifying a particular chunk signature value. Chunk signatures represented by the same reference symbol represent identical chunk signatures (e.g., a chunk signature "SIG-1" is identical to another chunk signature "SIG-1"), and chunk signatures represented by different reference symbols are different (i.e., not identical) chunk signatures (e.g., chunk signature "SIG-1" is not identical to chunk signatures "SIG-2", "SIG-3", etc.). Although reference symbols of the form "SIG-X" are used herein for ease of illustration, examples described herein may use any suitable representation for the actual chunk signatures (e.g., binary representation, hexadecimal representation, etc.).

In some examples, instructions 122 may store secure flags 162 in some (or all) entries of container index 150. As described in more detail below, presence of a secure flag in an entry may indicate that the chunk represented by the chunk signature of that entry (i.e., the chunk pointed to by that entry) is to be securely erased by a secure erase procedure when erased. In some examples, the secure flag may be presented when a particular value is present in a particular field of a container index entry. For example, as illustrated in FIG. 1A, each entry may have a secure flag field ("SEC FLAG") to store secure flags 162. In such examples, a chunk signature may be considered to "have" an associated secure flag when the secure flag field for the entry containing that chunk signature includes a predefined secure flag value, such as "T" (for "true"), "1", or the like. In such examples, a chunk signature may be considered not to have an associated secure flag when the secure flag field for the entry containing that chunk signature includes does not include that predefined secure flag value, and either contains no value (e.g., NULL) or contains a different value, such as "F" (for "false"), "0", or the like. In examples described herein, the secure flag may be implemented in any suitable manner. Although illustrated in the example of FIG. 1A, some embodiments may omit secure flags 162 and the secure flag field of the container index entries.

In the example of FIG. 1A, instructions 122 may also store, in the container index(es) 220, at least one persistent item tag corresponding to each chunk signature of each container index. In such examples, each persistent item tag may correspond to one of the chunk signatures of the respective container index and identify a respective backup item of the deduplication store that references or formerly referenced that chunk signature. For example, in the example of FIG. 1A, instructions 122 may store persistent item tags 163 in each of entries 151-155 of container index 150. For example, instructions 122 may store at least one persistent item tag for each of chunk signatures 161 of container index 150. In such examples, each of the persistent item tags 163 may correspond to one of the chunk signatures 161 (e.g., the chunk signature in the same entry of container index 150) and identify a respective backup item 200 of deduplication store 170 that references or formerly referenced that chunk signature.

In examples described herein, a "persistent item tag" may be information corresponding to a given chunk signature and identifying a respective backup item that references or formerly referenced the given chunk signature. In examples described herein, each persistent item tag corresponding to a chunk signature (e.g., based on final matching results) may remain with (or associated with) the corresponding chunk signature until the corresponding chunk signature is removed from the container index containing that chunk signature. For example, each persistent item tag corresponding to a chunk signature (e.g., based on final matching results) may remain with (or associated with) the corresponding chunk signature until the entry in the container, index including the persistent item tag and the corresponding chunk signature, is erased from the container index.

In examples described herein, a backup item "references" a given chunk signature of a given container index when a manifest of the backup item includes the given chunk signature and an indication that the given chunk signature is associated with the given container index (e.g., via an identifier for the given container index associated with the given chunk signature in the manifest). In examples described herein, a backup item "formerly referenced" a given chunk signature of a given container index when, prior to erasure of the backup item and/or a manifest of the backup item, the manifest of the backup item included the given chunk signature and an indication that the given chunk signature is associated with the given container index. In examples described herein, a backup item "references" a given chunk when the backup item includes a reference to the chunk signature in a container index entry including location data for the given chunk in the container corresponding to the container index. In such examples, a backup item may be said to reference a given chunk via a chunk signature for the chunk in a container index, for example.

In the example of FIG. 1A, instructions 122 may also store and update reference counts 164 for each entry of each of the container indexes 220. In such examples, each reference count in an entry (and corresponding to the chunk signature of that entry) may indicate how many references to the chunk represented by the chunk signature of that entry (i.e., the chunk pointed to by that entry) are made by the various manifests of the backup items of the deduplication store 170 (e.g., via the chunk signature for the chunk in the container index). In the example of FIG. 1A, instructions 122 may also location data 165 for each entry of each of container indexes 220. In such examples, each instance of location data 165 in an entry (and corresponding to the chunk signature of that entry) may specify the location of the respective chunk in the corresponding container (e.g., via an offset and length, or the like).

Examples related to using data and metadata of deduplication store 170 to store data in a deduplicated form will now be described in relation to FIG. 1A. In the example of FIG. 1A, instructions 122 may receive a request 180 (e.g., from a client computing device, such as a host, server, etc.) to store a data stream 181 as a backup item 12, and, in response, may begin dividing data stream 181 into chunks and obtaining chunk signatures for each of the chunks (as described above). In such examples, for each chunk, instructions 122 may store the chunk signature derived from the chunk in a manifest 212 of the backup item 12, such that manifest 212 includes a respective chunk signature for each of the chunks of the data stream 181 with the respective chunk signatures stored in the manifest 212 in the same order as the chunks themselves occur in the data stream 181.

For example, a given one of the chunks of data stream 181 may be a chunk having a chunk signature SIG-4. To determine whether a copy of the given chunk is already stored in one of containers 240 of deduplication store 170, chunk signature SIG-4 for the given chunk may be compared against chunk signatures of at least one of container indexes 220 to find an identical chunk signature. For example, instructions 122 may search container index 150, corresponding to container 250, at a time when container index 150 does not yet contain the illustrated entry 154. In such examples, instructions 122 may determine that no chunk signature identical to SIG-4 is present in container index 150 and, in response, may add the given chunk represented by chunk signature SIG-4 to container 250 as chunk 204, and may add a new entry 154 to container index 150. The new entry 154 may include chunk signature SIG-4 for the given chunk 204, location data 254 for the given chunk 204 in container 250, and an initial reference count of 1. In such examples, instructions 122 may add chunk signature SIG-4 to manifest 212 along with an identifier CI-150 to identify the container index including the chunk signature SIG-4, such that manifest 212 references chunk signature SIG-4 in container index 150.

In such examples, instructions 122 may store, in entry 154 of container index 150, a persistent item tag BI-12 identifying backup item 12 of deduplication store 170 as a backup item that references (or formerly referenced) chunk signature SIG-4. In such examples, instructions 122 may store persistent item tag BI-12 in container index 150 such that it corresponds to chunk signature SIG-4 (e.g., by storing it in entry 154 containing chunk signature SIG-4).

Continuing the above example, the next chunk of data stream 181 determined by instructions 122 (i.e., the next chunk after the given chunk 204) may be a chunk having a chunk signature SIG-1. To determine whether a copy of the next chunk is already stored in one of containers 240, instructions 122 may compare chunk signature SIG-1 against chunk signatures of at least one of container indexes 220 to find an identical chunk signature. For example, instructions 122 may again search container index 150 (corresponding to container 250), at a time when container index already contains an entry 151 for chunk signature SIG-1 (though having only one persistent item tag BI-11 and a reference count of 1).

In such examples, instructions 122 may determine that the identical chunk signature SIG-1 is present in container index 150 (i.e., in entry 151), and consider the chunk signatures SIG-1 to match. In response, the next chunk may not be added to any of the containers 240, as it would be a duplicate of a chunk 201 already stored in container 250 and corresponding to the identified identical chunk signature SIG-1. Rather, the chunk signature SIG-1 for the next chunk and an identifier CI-150 of container index 150 including chunk signature SIG-1 may be stored in manifest 212 to represent (i.e., point to, via container index 150; see dotted arrow in FIG. 1A) the copy of chunk 201 that is already stored in container 250 at location indicated by location data 251 in entry 151, and such that manifest 212 references chunk signature SIG-1 in container index 150. Instructions 122 may also increment the reference count 164 of entry 151 from one to two, to reflect that there are now two references to chunk 201 (i.e., via chunk signature SIG-1) among the manifests of backup items 200.

In such examples, instructions 122 may also store, in entry 154 of container index 150, persistent item tag BI-12 identifying backup item 12 of deduplication store 170 that references chunk signature SIG-1. Instructions 122 may store persistent item tag BI-12 in entry 154 such that it corresponds to chunk signature SIG-4. In such examples, instructions 122 may add persistent item tag BI-12 to entry 151, such that entry 151 includes persistent item tags BI-11 and BI-12, identifying backup items 11 and 12 of deduplication store 100 as backup items that reference or formerly referenced chunk signature SIG-1.

In some examples, request 180 may be a request to store data stream 181 as a secure backup item to be securely erased. In such examples, instructions 122 may store a secure flag (e.g., "T") in each of entries 151 and 154, which are referred to by backup item 12 for data stream 181. In other examples, when request 180 is not a request to store data stream 181 as a secure backup item, instructions 122 may not store a secure flag (e.g., "T") in either of entries 151 or 154 (e.g., by storing "F" or nothing in the secure flag field for those entries, for example).

For illustrative purposes, the handling of two example chunks of data stream 181 and their corresponding chunk signatures for backup item 12 were described above. Other chunks may be processed as described above in relation to two specific chunks of data stream 181 (including chunks before and after those of data stream 181, and chunks of other data streams such as those for other backup items 10, 11, 13, etc.). As such, in the example of FIG. 1A, instructions 122 may build backup items 200, container indexes 220, and containers 240 over time as instructions 122 ingest various data streams for storage in deduplicated form as backup items 200, in a manner as described above in relation to the example chunks of data stream 181 for backup item 12.

Although, for illustrative purposes, FIG. 1A shows four backup items 200 (10-13), one container index 150, and one container 250 of deduplication store 170, deduplication store 170 may include any suitable number of backup items (e.g., more or less than four), any suitable number of container indexes 220 (e.g., more than one), and any suitable number of containers 240 (e.g., more than one).

In the example of FIG. 1A, a backup item 10 may comprise a manifest 210 including at least a chunk signature SIG-9 associated with a container index identifier CI-131 for one of container indexes 220 that is not shown, followed by at least a chunk signature SIG-3 associated with container index identifier CI-150 of container index 150 and referring to entry 153 of container index 150. A backup item 11 may comprise a manifest 211 including at least a chunk signature SIG-27 associated with a container index identifier CI-133 for one of container indexes 220 that is not shown, followed by at least a chunk signature SIG-1 associated with container index identifier CI-150 of container index 150 and referring to entry 151 of container index 150. As described above, backup item 12 may comprise manifest 212 including at least chunk signature SIG-4 associated with a container index identifier CI-150 and referring to entry 154 of container index 150, and followed by at least chunk signature SIG-1 associated with container index identifier CI-150 and referring to entry 151 of container index 150. A backup item 13 may comprise a manifest 213 including at least a chunk signature SIG-2 associated with container index identifier CI-150 and referring to entry 152 of container index 150, and followed by at least a chunk signature SIG-5 associated with container index identifier CI-150 referring to entry 155 of container index 150 (as shown by the dotted arrow between them).

As noted above, container index 150 may correspond to container 250. In such examples, each entry of container 150 may correspond to one of chunks 260 of container 250. For example, entry 151 may comprise chunk signature SIG-1 representing chunk 201, and may include other data corresponding to chunk signature SIG-1, including a secure flag ("T") (in some examples), persistent item tags BI-11 and BI-12, a reference count of two for chunk 201, and location data 251 indicating the location of chunk 201 in container 250 (e.g., via an offset and length, or any other suitable data). Entry 152 may comprise a chunk signature SIG-2 representing a chunk 202, and may include other data corresponding to chunk signature SIG-2, including a secure flag ("T") (in some examples), a persistent item tag BI-13, a reference count of one for chunk 202, and location data 252 indicating the location of chunk 202 in container 250.

Entry 153 may comprise a chunk signature SIG-3 representing a chunk 203, and may include other data corresponding to chunk signature SIG-3, including a persistent item tag BI-10, a reference count of one for chunk 203, and location data 253 indicating the location of chunk 203 in container 250, and may not include a secure flag (illustrated by "F" in entry 153). Entry 154 may comprise chunk signature SIG-4 representing chunk 204, and may include other data corresponding to chunk signature SIG-4, including a secure flag ("T") (in some examples), persistent item tag BI-12, a reference count of one for chunk 204, and location data 254 indicating the location of chunk 204 in container 250. Entry 155 may comprise a chunk signature SIG-5 representing a chunk 205, and may include other data corresponding to chunk signature SIG-5, including a secure flag ("T") (in some examples), persistent item tag BI-13, a reference count of one for chunk 205, and location data 255 indicating the location of chunk 205 in container 250 (as illustrated by the dotted arrow between them in FIG. 1A).

Although, for ease of explanation, examples are described herein in relation to container indexes comprising entries, each including a chunk signature and other data corresponding to the chunk signature, other examples may implement the container indexes in any suitable manner, and may associate each chunk signature with the other data corresponding to it in any suitable manner.

Examples related to erasure of backup items will now be described in relation to FIGS. 1A-1E. In the example of FIG. 1A, after instructions 122 store backup items 200, container indexes 220, and containers 240, as described above, instructions 124 (e.g., when executed by processing resource 110) may receive a request 182 to erase a specified one of backup items 200.

In response to request 182, instructions 124 may erase each chunk referenced exclusively by the specified backup item, without erasing any chunk referenced by any other backup item of backup items 200. For example, request 182 may be a request to erase backup item 12. In such examples, in response to request 182, instructions 124 may erase each chunk referenced exclusively by backup item 12, without erasing any chunk referenced by any other backup item of backup items 200 (e.g., backup items 10, 11, and 13).

In the example of FIG. 1A, manifest 212 references chunk signatures SIG-1 and SIG-4 in container index 150, as described above, which represent chunks 201 and 204 in container 250, respectively (as described above). In examples described herein, a backup item may be said to "reference" a given chunk in a given container when the manifest includes (or otherwise references) the chunk signature for the given chunk in the container index for the given container. In such examples, instructions 124 may determine that backup item 12 references chunks 201 and 204 of container 250, based on manifest 212 referencing chunk signatures SIG-1 and SIG-4 in container index 150. In such examples, as may be seen in FIG. 1A, chunk 204 may be referenced exclusively by backup item 12 (i.e., as it is not referenced by any other backup item of backup items 200), but chunk 201 may be referenced by both backup items 11 and 12, and thus is not referenced exclusively by backup item 12. In such examples, instructions 124 may erase chunk 204 but not chunk 201 in response to request 182, as described below in relation to FIGS. 1A and 1B.

Referring to FIGS. 1A and 1B, in response to request 182 to erase backup item 12, for each of container indexes 220, instructions 124 may, decrement a reference count in the container index for each chunk signature of the container index that is referenced by backup item 12. In some examples, instructions 124 may perform this decrementing by walking the manifest 212 and decrementing the reference count for each chunk signature referenced in the manifest 212. In such examples, as shown in FIGS. 1A and 1B, instructions 124 may walk manifest 212, and when instructions 124 arrive at chunk signature SIG-4 (referring to container index 150), and instructions 124 may decrement the reference count of entry 154 for chunk signature SIG-4 from one to zero, as shown in FIG. 1B, without removing persistent item tag BI-12 of entry 154 (as also shown in FIG. 1B).

Instructions 124 may then proceed to the next chunk signature in manifest 212, and arrive at chunk signature SIG-1 (referring to container index 150), and in response instructions 124 may decrement the reference count of entry 151 for chunk signature SIG-1 from two to one, as shown in FIG. 1B, without removing persistent item tag BI-12 of entry 154 (as also shown in FIG. 1B). In such examples, instructions 124 may decrement reference counts for chunks referenced exclusively by backup item 12 and for chunks also referenced by other backup item(s). In such examples, instructions 124 may also erase, from deduplication store 170, manifest 212 for backup item 12. As noted above, the manifest 212 may include a list of the chunk signatures (e.g., SIG-4, SIG-1, etc.) that represent chunks (e.g., 204, 201, etc.) that make up the data stream 181 represented by the backup item 12. In such examples, any other (or all) manifests of backup item 12, if any, may be erased along with manifest 212. In the example of FIG. 1A, after manifest 212 is erased, backup item 12 no longer references those chunk signatures, because the manifest 212 of backup item 12 that referenced those chunks has been erased (and backup item 12 itself may have been erased in some examples). In such examples, the persistent item tags BI-12 identifying backup item 12 may remain associated with the chunk signatures they correspond to (e.g., chunk signatures SIG-1 and SIG-4 of entries 151 and 154, respectively), even after backup item 12 no longer references those chunk signatures, as shown in FIG. 1B.

In some examples, the above-described reference count decrementing and the erasure of the manifest(s) and backup item may be performed synchronously by instructions 124, in response to the request 182. In some examples, instructions 124 may also implement an asynchronous housekeeping process to erase chunks based on reference counts of zero, as described below.

In such examples, instructions 124 may asynchronously (i.e., in response to a suitable trigger condition) begin a housekeeping process to erase container index entries containing reference counts of zero, and to erase chunks represented by chunk signatures included in those entries. For example, after instructions 124 decrement reference counts based on the request 182, as described above, instructions 124 may identify entry 154 in container index 150 as having a reference count of zero, and in response, may erase chunk 204 (based on location data 254 of entry 154) and erase entry 154, as shown in FIGS. 1B and 10. In such examples, as illustrated in FIG. 10, entry 151 for chunk signature SIG-1 remains, even though its reference count was decremented, since it still has a reference count that is above zero. In such examples, the persistent item tag BI-12 for backup item 12 may continue to remain with chunk signature SIG-1 (for chunk 201) in entry 151. In some examples, instructions 128 may output an indication that data exclusive to backup item 12 (i.e., data that is not shared with other backup item(s)), has been erased, since backup item 12, manifest 212, and the chunks referenced exclusively by backup item 12 were erased.

In such examples, in response to request 182 to erase backup item 12, instructions 124 may, for each chunk (e.g., 204) referenced exclusively by backup item 12, erase the chunk (e.g., 204), and remove (e.g., erase) from container index 150 the chunk signature entry 154 including the chunk signature (e.g., SIG-4) that represents the chunk (SIG-4). In such examples, the erased chunk signature entry 154 may include at least one persistent item tag (e.g., BI-12) corresponding to chunk signature (e.g., SIG-4), and those persistent item tag(s) (e.g., BI-12) may be removed from container index 150 when the entry 154 containing them is erased from the container index 150 (and not before). At this time, at least some data shared by backup item 12 is still present in deduplication store 170, such as at least chunk 201. In such examples, chunk 201 remains tagged as shared by backup item 12 by the presence of persistent item tag BI-12 in entry 151 for chunk signature SIG-1 representing chunk 201.

After the request 182 to erase is received by instructions 124, instructions 124 may receive one or more further requests 184 to erase one or more other backup items of backup items 200. In such examples, instructions 124 may process the requests 184 as described above in relation to request 182. As an example, one of the request(s) 184 may be a request 184 to erase backup item 11 of backup items 200. In such examples, in response to the request 184, instructions 124 may, for example, based on walking manifest 211, instructions 124 may decrement the reference count of entry 151 for chunk signature SIG-1 from one to zero, as shown in FIG. 1D, without removing either of persistent item tags BI-11 and BI-12 of entry 151 (as also shown in FIG. 1D). In such examples, instructions 124 may also erase backup 11 including manifest 211. In such examples, instructions 124 may also asynchronously (i.e., in response to a suitable trigger condition) begin the above-described housekeeping process, including erasing chunk 201 (based on location data 251 of entry 151) and erase entry 151, as shown in FIGS. 1D and 1E. In such examples, the erased chunk signature entry 151 may include persistent item tags BI-11 and BI-12 corresponding to chunk signature SIG-1, and those persistent item tags BI-11 and BI-12 may be removed from container index 150 when the entry 151 containing them is erased from container index 150, as shown in FIG. 1E, (and not before).

In such examples, after the request 184 to erase backup item 11 (e.g., after at least some processing of request 184, as described above, instructions 126 may determine that all chunks formerly referenced by backup item 12 have been erased, based on the persistent item tags in the container indexes 220. For example, after the processing of request 184 illustrated in FIGS. 1D and 1E, instructions 126 may search each of container indexes 220 for any persistent item tag(s) BI-12 identifying backup item 12 remaining in any of the container indexes 220. For example, in an example in which the container index of FIG. 1A has been modified as shown in FIG. 1E (in response to requests to erase, as described above), instructions 126 may search container index 150 (of FIG. 1E) and determine that are no persistent item tags BI-12 identifying backup item 12 remaining in container index 150, which is at least because the last entry including persistent item tags BI-12 was erased when backup item 11 was erased (as backup items 11 and 12 shared block 201). In such examples, instructions 126 may similarly determine that there are no persistent item tags BI-12 identifying backup item 12 remaining in any of container indexes 220. In such examples, instructions 126 may determine that all chunks formerly referenced by backup item 12 have been erased, based on the determination that there are no persistent item tags BI-12 identifying backup item 12 remaining in any of the container indexes 220 of deduplication store 170.

In such examples, in response to the determination that all chunks formerly referenced by backup item 12 have been erased, instructions 128 may output an indication 186 that backup item 12 has been erased. In such examples, the indication 186 may be an output to another computing device, system, software (e.g., processor executable instructions), an output to a user (e.g., via a graphical user interface, or other notification mechanism or system), or any other suitable type of output from deduplication system 100. By utilizing persistent item tags, examples described herein may be able to track when all blocks of data referenced by a backup item are erased, and provide an indication when all such blocks are eventually erased, even if they are not all erased in response to a request to erase the backup item due the blocks being shared with other backup items, for example. Such examples, may further be able to provide an indication when all such blocks are eventually erased, even if they are not all erased in response to a request to erase the backup item due the blocks being shared with other backup items, either when secure flags are used (as described herein) or when secure erase is enabled for the entire deduplication store 170 (or deduplication system 100) at the time of the erasure. In such examples, when secure erase is enabled for the entire deduplication store 170 (or deduplication system 100), any erasure of a block may be done via a secure erase procedure.

Referring again to FIG. 1A, as noted above, some example may utilize a secure flag when a data stream is requested to be stored as a secure item to be securely erased, as described above. In such examples, the request 180 may be a request to store data stream 181 as a secure backup item 12 to be securely erased. In such examples, based on the request 180 to store backup item 12 as a secure item, instructions 124 may store a secure flag in container indexes 220 for each chunk signature referenced by backup item 12 of backup items 200. In such examples, instructions 124 may store data stream 181 as backup item 12, as described above, but with each chunk signature referenced by backup item 12 having the secure flag (e.g., "T"), as described above. For example, in such examples, entry 151 for chunk signature SIG-1 may have a secure flag (e.g., "T") and entry 154 for chunk signature SIG-4 may have a secure flag (e.g., "T").

In such examples, in response to a request 182 to erase backup item 12, instructions 124 may erase each chunk referenced exclusively by backup item 12, as described above, and in addition, based on the secure flags, may perform a secure erase procedure on each such chunk. For example, in such examples, in response to the request 182 to erase backup item 12, for each chunk referenced exclusively by backup item 12, instructions 124 may determine whether the chunk is represented by a chunk signature having an associated secure flag in the container indexes 220, and if so, perform a secure erase procedure to erase the chunk. For example, in the example of FIGS. 1A-1C, in response to the request 182 to erase backup item 12, instructions 124 may determine that chunk 204 is represented by a chunk signature SIG-4 having an associated secure flag (e.g., "T" in entry 154 for chunk signature SIG-4) in container index 150, and based on that determination, may perform a secure erase procedure to erase chunk 204.

In such examples, one or more chunks referenced by backup item 12 may still remain in container 250, such as chunk 201 represented by chunk signature SIG-1 of entry 151 of container index 150, for example, which may still have the persistent item tag BI-12, as described above. As such, instructions 128 may not output an indication 186 that all blocks referenced by backup item 12 have been securely erased.

In such examples, some of the remaining chunks referenced by backup items 200 may be erased. For example, instructions 124 may receive a request 184 to erase backup item 11 (as described above), and due to the presence of secure flag in entry 151 for chunk signature SIG-1 referenced by backup item 11, instructions 124 may perform a secure erase procedure on chunk 201, when it is erased in response to the request 184, as described above (see FIGS. 1D and 1E). In such examples, after some of the remaining chunks referenced by the backup items 200 are erased (e.g., including chunk 201), instructions 126 may determine, based on the persistent item tags in the container index 220 (i.e., based on the container indexes 220 containing no persistent item tags BI-12), that all chunks formerly referenced by backup item 12 have been securely erased, both because data stream 181 was requested to be stored as a secure backup item to be securely erased (and as such each chunk was associated with a secure flag), and because container indexes 220 containing no persistent item tags BI-12. In such examples, in response to the determination that container indexes 220 do not contain persistent item tags BI-12, instructions 128 may output an indication 186 that backup item 12 has been securely erased.

Further examples are described herein in relation to FIG. 1A and FIGS. 2A-2C, which are block diagrams of the example container and container index of FIG. 1A at different points in time. In some examples, for a container containing block(s) to be securely erased and other block(s) that are not to be securely erased, it may be beneficial to group together in the container the blocks that are to be securely erased. For example, in the example of FIG. 1A, secure flags 162 of container index 150 indicate that blocks 201, 202, 204, and 205 are to be securely erased (e.g., based on the secure flag associated with chunk signatures SIG-1, SIG-2, SIG-4, and SIG-5), while block 203 is not to be securely erased (e.g., based on the absence of a secure flag associated with chunk signature SIG-3).

Blocks 201-205 may be ordered in container 250 as shown in FIG. 1A, and in such examples, securely erasing blocks of a backup item may involve multiple different partial secure erase operations. For example, securely erasing blocks of backup item 13 may involve instructions 124 seeking to block 202 in container 250, performing the secure erase on block 202, then seeking to block 205 in container 250 and performing the secure erase on block 205. Since the blocks 202 and 205 to be securely erased as separated by blocks of different backup items, and at least one block that is not to be securely erased (e.g., block 203), it may not be possible to erase both blocks in a single secure erase operation over a continuous region. In some examples, the blocks may be appropriately grouped in the containers to enable more efficient performance of secure erase operations over continuous regions of blocks to be securely erased.

Referring to FIG. 1A, in some examples, for one or more of container indexes 220, instructions 122 may determine a sorted order for the chunk signatures of the container index based on the presence or absence of a secure flag for each chunk signature, and each persistent item tag for each chunk signature. Based on the determined sorted order for the chunk signatures of a container index, instructions 122 may reorder the chunks in a container corresponding to the container index based on the determined sorted order for the chunk signatures (the chunk signatures of the container index representing the chunks of the container). Instructions 122 may perform such sorting and reordering for one or more (of each) of container indexes 220.

Figure 2A:
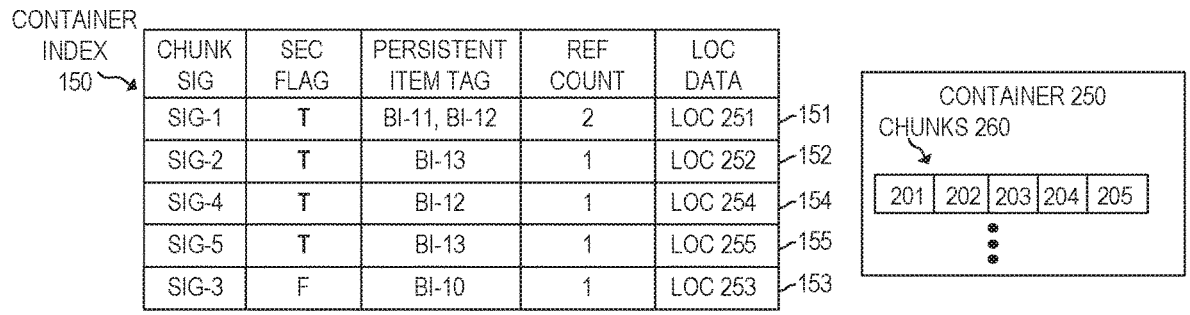
FIGS. 2A-2C are block diagrams of the example container and container index of FIG. 1A at different points in time.

For example, referring to FIGS. 1A and 2A-2C, instructions 122 may determine a sorted order for the chunk signatures 161 of container index 150 of FIG. 1A, based on the presence or absence of a secure flag 162 in the entries for each of chunk signatures 161. For example, as shown in FIG. 2A, entries 151-155 for chunk signatures 161 may be sorted such that the entries for chunk signatures 161 having a secure flag (e.g., "T") are before each entry for a chunk signature not having a secure flag in container index 150. In the example of FIG. 2A, this may result in container index 150 having a new order of entries, with entries 151, 152, 154, and 155 (for chunk signatures SIG-1, SIG-2, SIG-4, and SIG-5, respectively) having a secure flag preceding entry 153 (for chunk signatures SIG-3) not having a secure flag. As illustrated in FIG. 2A, instructions 122 have not changed the order of chunks in container 250 in response to this sorting.

Figure 2B:
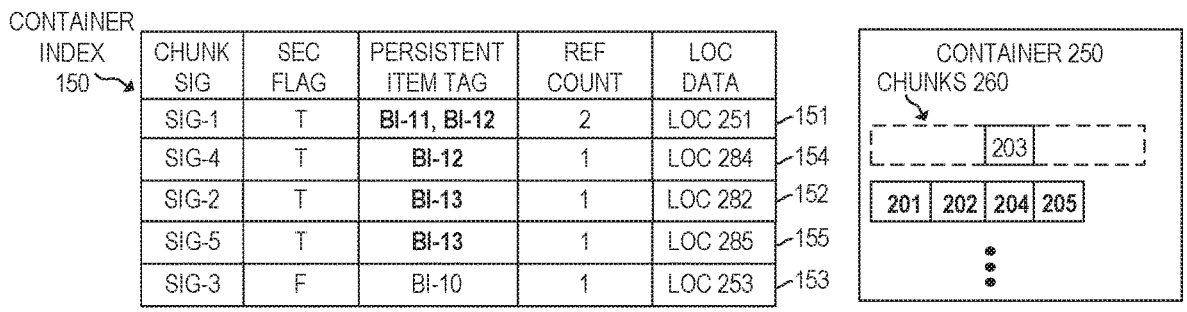

In some examples, instructions 122 may further sort chunk signatures 161 based on the persistent item tag in the entries for chunk signatures 161. For example, as shown in FIG. 2B, entries 151-155 may be sorted based on a sub-ordering of the persistent item tags included in the entries for chunk signatures 161, proceeding BI-11, BI-12, BI-13 among the entries having a secure flag (e.g., "T"). In the example of FIG. 2B, this may result in container index 150 having entries ordered as follows: entry 151 (for SIG-1, based on BI-11), entry 154 (for SIG-4, based on BI-12), entry 152 (for SIG-2, based on BI-13), entry 155 (for SIG-5, based on BI-13), entry 153 (for SIG-3, based on entry 153 not having a secure flag). In such examples, instructions 122 may reorder the chunks 206 in container 250 based on the determined sorted order, such that the chunks to be securely erased are located in continuous, sequential locations within container 250 and ordered based on the persistent item tags. For example, instructions 122 may re-write the chunks 201, 202, 204, and 205, in that order, to contiguous locations in container 250 different than where they were located before the sorting (as illustrated in FIG. 2B). The order of chunks 201, 202, 204, and 205 corresponds to the determined order of chunk signatures for the entries of container index 150 (e.g., SIG-1, SIG-4, SIG-2, and SIG-5). In some examples, instructions 122 may reorder chunks in container 250 (i.e., based on the new sorted order) opportunistically, such as when performing other insertion(s) or deletion(s) of chunk(s) for container 250.

Figure 2C:
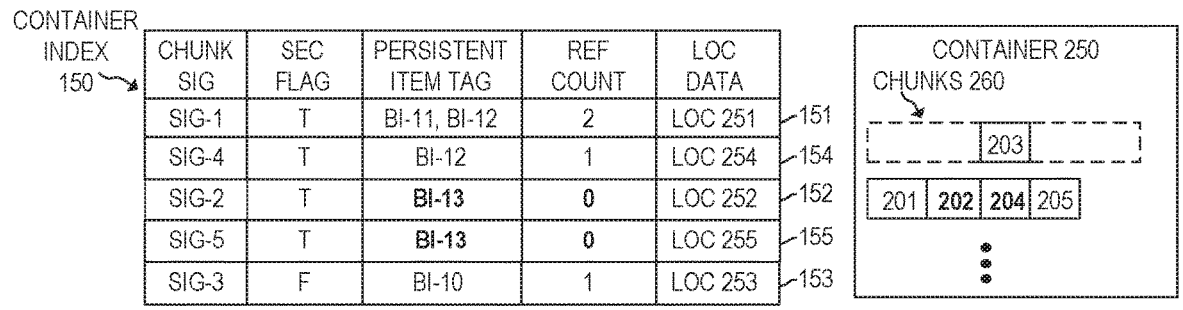

In such examples, securely erasing blocks of backup item 13, for example, may involve instructions 124 seeking to block 202 in container 250, and performing a single secure erase on a contiguous region of container 250 including blocks 202 and 204 that are now adjacent to one another in container 250 (as shown in FIG. 2C). This secure erase may be performed on all chunks of container 250 having a reference count of zero (as described above and shown in FIG. 2C). In such examples, the above-described sorting may enable more efficient performance of secure erase procedures over larger contiguous regions of blocks, rather than piecemeal for a plurality of disjoint blocks.

In some examples, instructions 122 may take a secure flag into account when determining matches between chunk signatures for purposes of the deduplication process. An example of using secure flags for chunk signature matching will now be described in relation to FIG. 1A and FIG. 2D, which is a block diagram of example containers and container indexes. Referring to FIG. 1A, after backup items 11 and 12 are erased, as described above in relation to FIGS. 1A-1E, container 250 and container index 150 may have the state (e.g., contents) illustrated in FIG. 2D (which is the same as the state illustrated in FIG. 1E).

Figure 2D:
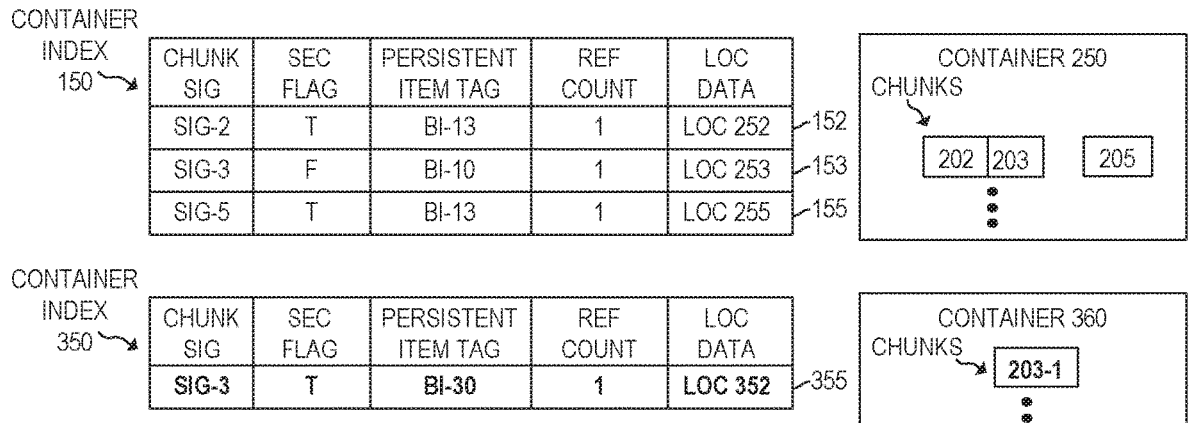
FIG. 2D is a block diagram of example containers and container indexes.

In such an example of FIG. 1A, in which container 250 and container index 150 have the state illustrated in FIG. 2D, instructions 122 may receive a request 180 to store a new data stream as a new secure backup item for which at least some of the chunks are to be securely erased. In response, instructions 122 may determine chunk signatures for the new backup item based on chunks of data for the new data stream of the new backup item, and may compare the determined chunk signatures for the new backup item to the chunk signatures stored in the container indexes 220, including container index 150. In such examples, for each of the determined chunk signatures for which there is an identical chunk signature stored in one of the container indexes 220, instructions 122 may determine that the determined chunk signature matches the identical chunk signature in the container index when the identical chunk signature has an associated secure flag (and not when the identical chunk signature does not have an associated secure flag).

For example, a given one of the chunks of the new data stream may be a chunk having a chunk signature SIG-5. To determine whether a copy of the given chunk is already stored in one of containers 240 of deduplication store 170, chunk signature SIG-5 for the given chunk may be compared against chunk signatures of at least one of container indexes 220 to find an identical chunk signature, as described above. For example, instructions 122 may search container index 150 (as illustrated in FIG. 2D) corresponding to container 250. In such examples, instructions 122 may determine that the chunk signature of entry 155 is identical to the chunk signature SIG-5 of the given chunk. In some examples, instructions 122 may further determine whether entry 155 has a secure flag for chunk signature SIG-5 of entry 155, when the new data stream is to be stored as a secure item. Since entry 155 has a secure flag in the example of FIG. 2D, then instructions 122 may consider the chunk signature SIG-5 of entry 155 to be a match of the chunk signature SIG-5 of the given chunk of the new data stream. In response, instructions 122 may add chunk signature SIG-5 to the manifest of the new backup item (not shown), increment the reference count of the identical chunk signature SIG-5 in entry 155 from one to two (not shown), add a persistent item tag corresponding to the identical chunk signature SIG-5 (i.e., in entry 155) and identifying the new backup item (as described above). The given chunk of the new data stream may not be added to any of the containers 240, since a match was found.

Continuing the above example, a next chunk of the new data stream may be a chunk having a chunk signature SIG-3. Instructions 122 may search container index 150 and determine that the chunk signature of entry 153 is identical to the chunk signature SIG-3 of the next chunk. As described above, in some examples, instructions 122 may further determine whether entry 153 has a secure flag for chunk signature SIG-3 of entry 153, since the new data stream is to be stored as a secure item. Since entry 153 does not have a secure flag (e.g., "F") in the example of FIG. 2D, then instructions 122 may determine that the chunk signature SIG-3 of the next chunk does not match the identical chunk signature SIG-3 of entry 153 of container index 153. In such examples, in response to a determination that the chunk signature SIG-3 of the next chunk does not match the identical chunk signature SIG-3 of entry 153 based on the lack of a secure flag, instructions 122 may create a new container index 350 to store the chunk signature SIG-3 of the next chunk in a new entry 355 with a secure flag (e.g., "T")

and a persistent item tag (e.g., "BI-30") identifying the new backup item. In such examples, instructions 122 may also create a new container 360 to store the next chunk 203-1 represented by the chunk signature SIG-3. In such examples, the next chunk 203-1 may be identical to the chunk 203, but they are not deduplicated relative to each other, since one is to be securely erased (for the new backup item) and the other is not (e.g., for backup item 10).

In some examples, instructions 122 may performing matching based on identical chunk signatures and based on the secure flags, based on the amount of chunks of a new backup item that are to be securely erased. For example, the procedure described above in relation to FIG. 2D may be performed as described when the request to store the new data stream as a secure item specifies or implies that all (e.g., 100%) of the chunks of the secure item are to be securely erased. In other examples, a different minimum amount (or percentage) of the chunks may be specified.

In such examples, instructions 122 may perform a two stage matching process to meet the minimum threshold (e.g., amount, percentage, or the like). In such examples, the two stages may include a preliminary matching phase that matches chunk signatures based on identifying identical chunk signatures, and without reference to secure flags, and a final matching phase that may adjust the results of the preliminary matching to achieve the minimum threshold (if not met by the preliminary matching phase).

For example, for the preliminary matching phase, for each chunk signature of a chunk of the new data stream, when it is determined that an identical chunk signature is stored in one of the container indexes 220 (e.g., container index 150), then instructions 122 may determine that the chunk signature for the new data stream matches the identical chunk signature in the container index, regardless of whether the chunk signature in the container index has a secure flag, and may update the container indexes to reflect those matches, as described above. This may result in some, all, or none of the chunk signatures for the new data stream being matched against chunk signatures having secure flags, and thus the minimum threshold may or may not be met.

In such examples, for the final matching phase, if the minimum threshold is met or exceeded, then the matching results may be considered the final matching results for the chunk signatures for the new data stream. However, if the minimum threshold is not at least met, then in the final matching phase instructions 122 may create one or more new container index(es) for one or more of the chunk signatures for the new data stream, and entries add to the new container index(es) with secure flags for one or more of the chunk signatures for the new data stream that do not have the secure flag in the original container indexes (with appropriate updates to the containers and reference counts, etc.). Instructions 122 may move a sufficient number of the chunk signatures for the new data stream so that the minimum threshold is at least met. After moving the sufficient number of the chunk signatures to the new container index(es), then the adjusted matching results may be considered the final matching results for the chunk signatures for the new data stream. In such examples, persistent item tags may be information corresponding to a given chunk signature and identifying a respective backup item that references or formerly referenced the given chunk signature based on final matching results, and not based on preliminary matching results (as those may change in the final matching phase and do not produce the type of "former" reference being utilized in examples described herein).

Figure 3:
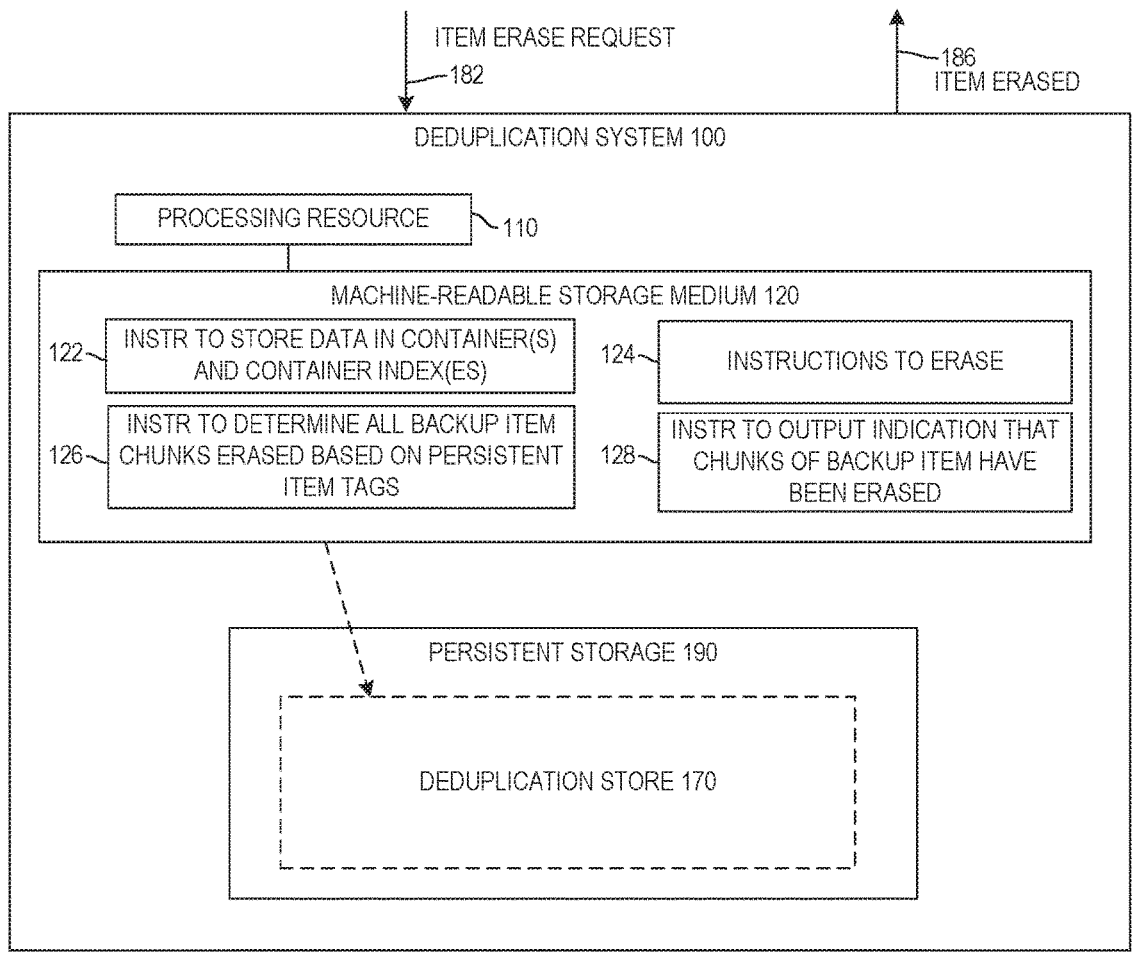
FIG. 3 is a block diagram of an example deduplication system to store persistent item tag(s) corresponding to chunk signature(s) and output an indication that a backup item has been erased.
Figure 4:
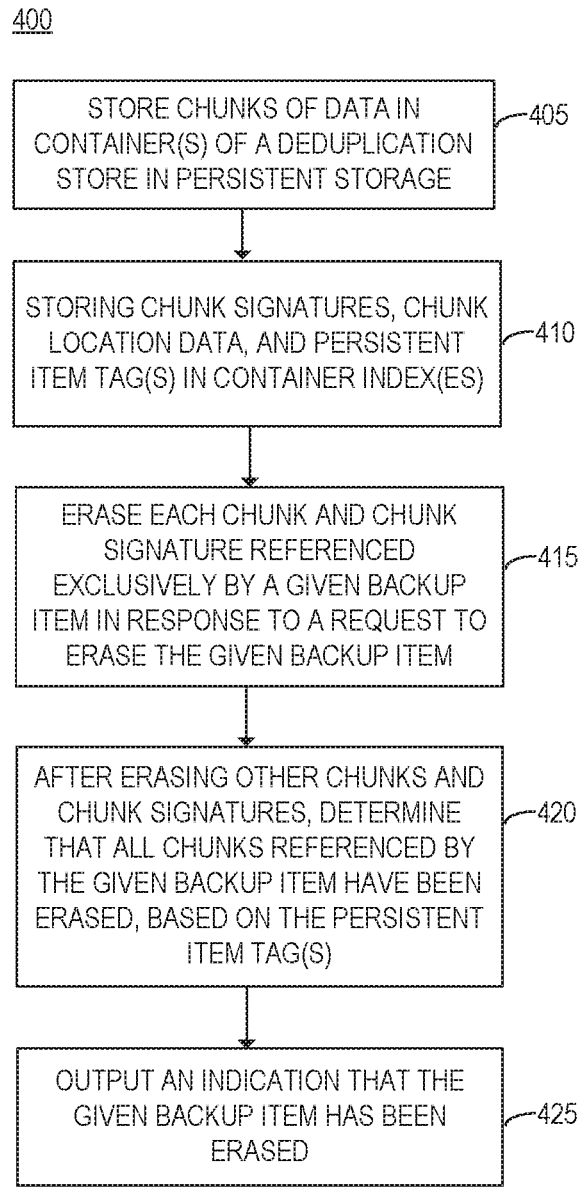
FIG. 4 is a flowchart of an example method that includes storing persistent item tag(s) corresponding to chunk signature(s)

Examples will now be described herein in relation to FIGS. 3 and 4, where FIG. 3 is a block diagram of an example deduplication system to store persistent item tag(s) corresponding to chunk signature(s) and output an indication that a backup item has been erased, and FIG. 4 is a flowchart of an example method 400 that includes storing persistent item tag(s) corresponding to chunk signature(s).

In the example of FIG. 3, deduplication system 100 comprises at least one processing resource 110, and a machine readable storage medium 120 comprising at least instructions 122, 124, 126, and 128, as described above in relation to FIG. 1A. Instructions 122 may store a deduplication store 170, as described above in relation to FIG. 1A, on persistent storage 190. In such examples, all data and metadata of deduplication store 170 (e.g., containers, container indexes, backup items, etc., as described above) may be stored on persistent storage 190. Persistent storage 190 may be implemented by one or more non-volatile storage devices such as one or more hard disk drives (HDDs), one or more solid state drives (SSDs), or one or more of any other suitable non-volatile storage device, or a combination thereof. In some examples, deduplication system 100 may comprise all of the storage device(s) implementing persistent storage 190 storing deduplication store 170, or one or more of the storage device(s) may be part of other computing device(s) separate from deduplication system 110 and with which deduplication system 110 may communicate.

In the example of FIG. 4, although execution of method 400 is described below with reference to deduplication system 100 of FIG. 3, other computing devices suitable for the execution of method 400 may be utilized (e.g., deduplication system 100 of FIG. 1A, etc.). Additionally, implementation of method 400 is not limited to such examples.

Referring to FIGS. 3 and 4, at 405 of method 400, instructions 122 of deduplication system 100 (e.g., when executed by at least one processing resource 110) may store chunks of data in at least one container of deduplication store 170 (e.g., as shown in FIG. 1A). In such examples, the container may be stored in persistent storage 190 of deduplication system 100, for example. At 410, instructions 122 may store, in at least one container index of the deduplication store 170, chunk signatures and chunk location data for each of the chunks and, for each chunk signature, at least one persistent item tag, as described above in relation to FIG. 1A, such that each persistent item tag corresponds to the respective chunk signature and identifies a respective backup item of deduplication store 170 that references or formerly referenced the corresponding chunk signature. In such examples, each persistent item tag is to remain with the corresponding chunk signature until the corresponding chunk signature is removed from the at least one container index.

At 415, in response to a request 182 to erase a given backup item of the backup items of deduplication store 170, instructions 124 may erase each chunk and chunk signature referenced exclusively by the given backup item, as described above. Instructions 124 may further erase chunks and chunk signatures of one or more other backup items of deduplication store 170. At 420, after erasing chunks and chunk signatures of one or more other backup items of the backup items, instructions 126 may determine, based on the persistent item tags in the at least one container index, that all chunks formerly referenced by the given backup item have been erased, as described above. At 425, in response to the determination that all chunks formerly referenced by the given backup item have been erased, instructions 128 may output an indication 186 that the given backup item has been erased, as described above.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof.

Figure 5:
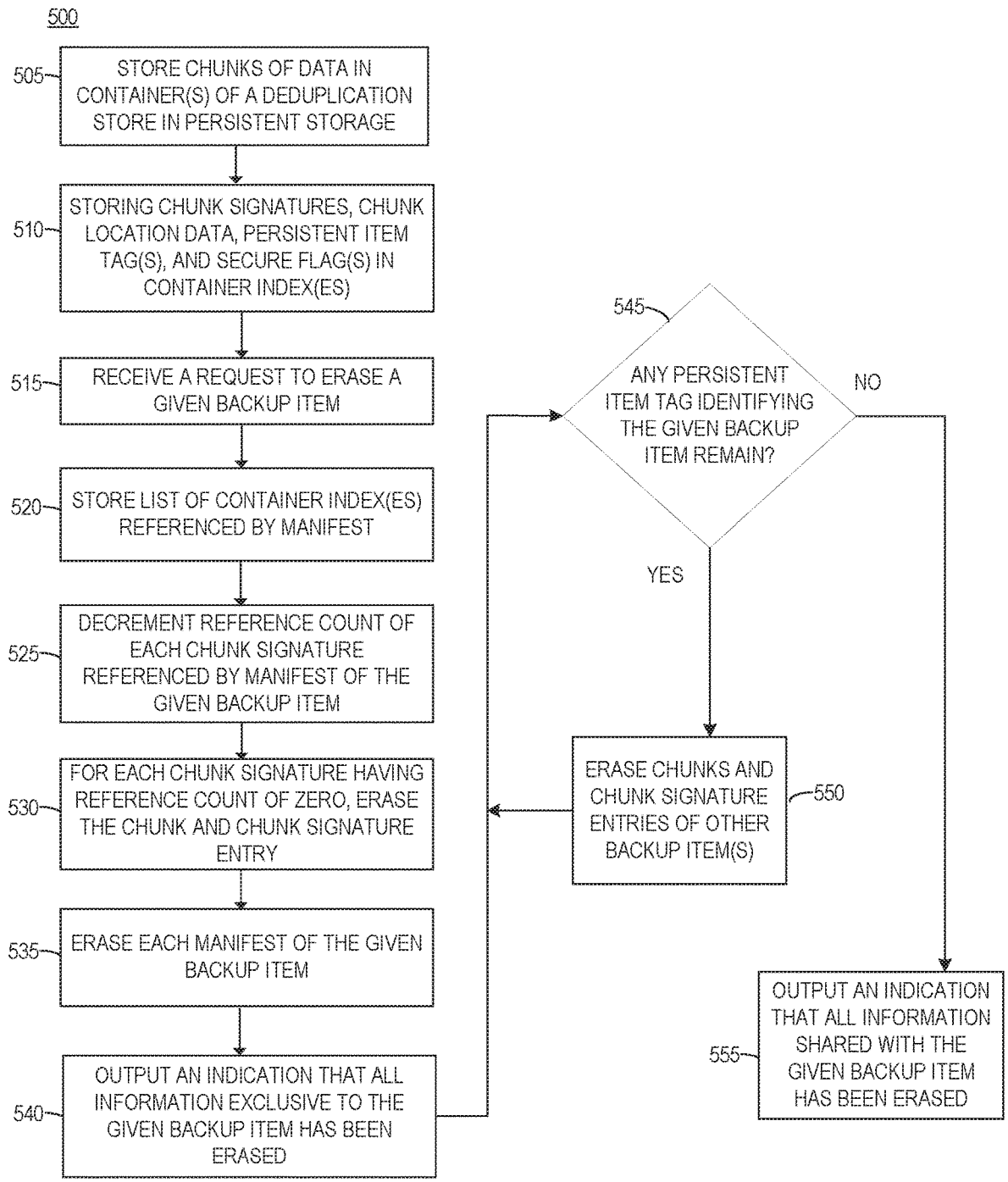
FIG. 5 is a flowchart of an example method that includes outputting an indication that information shared with a backup item has been erased.

Examples will now be described herein in relation to FIGS. 1A and 5, where FIG. 5 is a flowchart of an example method 500 that includes outputting an indication that information shared with a backup item has been erased. In the example of FIG. 5, although execution of method 500 is described below with reference to deduplication system 100 of FIG. 1A, other computing devices suitable for the execution of method 500 may be utilized (e.g., deduplication system 100 of FIG. 3, etc.). Additionally, implementation of method 500 is not limited to such examples.

Referring to FIGS. 1A and 5, at 505 of method 500, instructions 122 of deduplication system 100 (e.g., when executed by at least one processing resource 110) may store chunks 206 of data in at least one container 250 of deduplication store 170 (e.g., as shown in FIG. 1A). In such examples, the container 250 may be stored in persistent storage deduplication system 100, for example.

At 510, instructions 122 may store, in at least one container index 150, chunk signatures 161 and chunk location data 165 for each of the chunks 206 and, for each chunk signature 161, store at least one respective persistent item tag 163. In such examples, for each chunk signature, each persistent item tag 163 corresponds to the chunk signature and identifies a respective one of backup items 200 of deduplication store 170 that references or formerly referenced the chunk signature. Instructions 122 may also store, in the at least one container index 150, a secure flag 162 for each chunk signature referenced by a backup item of deduplication store 170 requested to be stored as a secure item to be securely erased.

At 515, instructions 124 may receive a request 182 to erase a backup item 12 of backup items 200. In response to request 182, instructions 124 may erase each chunk referenced exclusively by backup item 12 (e.g., 204), without erasing any chunk referenced by another backup item of backup items 200, as described above in relation to FIGS. 1A-1C. At 520, in response to request 182, instructions 124 may store a list of each of the container indexes 220 (e.g., container index 150) containing a chunk signature referenced by any manifest (e.g., 212) of backup item 12. In such examples, deduplication system 100 may use this list to determine which container indexes to check for persistent item tags when determining whether all chunks referenced or formerly referenced by backup item 12 have been erased.

At 525, in response to request 182, instructions 124 may decrement the reference count for each chunk signature in the at least one container index 150 referenced by any manifest (e.g., 212) of backup item 12 (e.g., as shown in FIG. 1B). At 530, after decrementing the reference count(s) at 525, instructions 124 may, for each chunk signature entry having a reference count of zero, erase the chunk signature entry (e.g., entry 154) and the chunk (e.g., chunk 204) represented by the chunk signature (e.g., SIG-4) of that chunk signature entry. In such examples, each of the chunk signature entries (e.g., 151-155, etc.) may comprise one of the chunk signatures 161, a respective reference count 164, and one or more persistent item tags 163. In some examples, to perform the erasing of chunks at 530, instructions 124 may perform a secure erase procedure for each chunk represented by a chunk signature having a secure flag. In some examples, after erasing each chunk signature entry having a reference count of zero (e.g., entry 154), at least one persistent item tag identifying backup item 12 may remain in the at least one container index 150 (e.g., BI-12 in entry 151). At 535, also in response to request 182, instructions 124 may erase each manifest (e.g., 212) of backup item 12 and, at 540, instructions 128 may output an indication that all information exclusive to backup item 12 has been erased, after the backup item 12 and its manifest(s) (e.g., 212), and the chunks referenced exclusively by backup item 12, have been erased.

At 545, instructions 126 may determine whether any persistent item tag identifying backup item 12 (e.g., persistent item tag BI-12) remains in any of the container indexes 220 of deduplication store 170. If so (YES at 545), then at 550, instructions 124 may erase the chunks and the chunk signatures of the one or more other backup items, as described above, in response to requests to erase those other backup item(s), for example. For example, after the above-described erasing of entry 154 and chunk 204 (as illustrated in FIGS. 1B and 10), instructions 126 may determine that persistent item tag BI-12 identifying backup item 12 remains in (at least) container index 150 (e.g., in entry 151 for chunk signature SIG-1). In such examples, at 550, instructions 124 may receive a request to erase backup item 11 (as described above), and may erase the chunks and the chunk signatures of backup item 11, as described above. In such examples, instructions 124 may erase the chunk signature entries for the chunk signatures of backup item 11 (e.g., entry 151), including each of the remaining persistent item tags (e.g., BI-12) identifying backup item 12. In some examples, instructions 124 may utilize a secure erase procedure to erase the chunks at 550, for each of the chunks that has an associated secure flag (e.g., associated with its chunk signature), as described above.

After 550, method 500 may return to 545 to again determine whether any persistent item tag identifying backup item 12 (e.g., persistent item tag BI-12) remains in any of the container indexes 220 of deduplication store 170. Continuing the example described above, after the request to erase backup item 11 and after instructions 124 have erased the chunk signature entries for the chunk signatures of backup item 11 (e.g., entry 151), including each of the remaining persistent item tags (e.g., BI-12) identifying backup item 12, as shown in FIG. 1E, instructions 126 may determine at 545 that no persistent item tag identifying backup item 12 (e.g., persistent item tag BI-12) remains in any of the container indexes 220 of deduplication store 170 (NO at 545), based on the persistent item tags in container indexes 220. In such examples, instructions 126 may utilize the list generated and stored at 520 to determine which of container indexes 220 contained persistent item tags (e.g., BI-12) identifying backup item 12, and may then check those specific container indexes 220 to make the determination at 545 of whether any persistent item tag identifying backup item 12 remains in any of the container indexes 220 of deduplication store 170.

In response to a determination that there are no persistent item tags identifying backup item 12 in any container index 220 (e.g., or in any container index of the list stored at 520 in response to the request to erase backup item 12) as illustrated in FIG. 1E (e.g., NO at 545), then at 555 instructions 128 may output an indication 186 that backup item 12 has been erased, as described above. For example, at 555, instructions 128 may output an indication 186 that all information of backup item 12 has been erased. In some examples (e.g., when backup item is requested to be a secure item, or secure erase is enabled for deduplication store 170), instructions 128 may output, at 555, an indication 186 that all chunks of backup item 12 has been securely erased. In such examples, each of the chunks may have been securely erased based on secure flags, as described above.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1A and 3, storage medium 120 may be implemented by one machine-readable storage medium, or multiple machine-readable storage media.

In examples described herein, a storage array may be a computing device comprising a plurality of storage devices and one or more controllers to interact with host devices and control access to the storage devices. In some examples, the storage devices may include HDDs, SSDs, or any other suitable type of storage device, or any combination thereof.

In some examples, the controller(s) may virtualize the storage capacity provided by the storage devices to enable a host to access a virtual object (e.g., a volume) made up of storage space from multiple different storage devices.

In some examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract and drawings), and/or all of the elements of any method or process so disclosed, may be combined in any combination, except combinations where at least some of such features and/or elements are mutually exclusive. For example, functionalities described herein in relation to any of FIGS. 1A-5 may be provided in combination with functionalities described herein in relation to any other of FIGS. 1A-5.

What is claimed is:

1. An article comprising at least one non-transitory machine-readable storage medium comprising instructions executable by at least one processing resource of a deduplication system to:
   store chunks of data in at least one container of a deduplication store;
   in at least one container index, store:
   chunk signatures and chunk location data for each of the chunks; and
   for each chunk signature, at least one persistent item tag each corresponding to the chunk signature and identifying a respective backup item of the deduplication store that references or formerly referenced the chunk signature, in response to a request to erase a first backup item of the backup items, erase each chunk referenced exclusively by the first backup item, without erasing any chunk referenced by a second backup item of the backup items;

after a request to erase the second backup item and based on the persistent item tags in the at least one container index, determine that all chunks formerly referenced by the first backup item have been erased; and in response to the determination, output an indication that the first backup item has been erased.

2. The article of claim 1, wherein each persistent item tag is to remain with the corresponding chunk signature until the corresponding chunk signature is removed from the at least one container index.

3. The article of claim 2, wherein the instructions to erase comprise instructions to, in response to the request to erase the first backup item:

for one of the at least one container index, decrement a reference count in the container index for a given one of the chunk signatures that is referenced by the first backup item and the second backup item, wherein a persistent item tag identifying the first backup item remains associated with the given chunk signature even after the first backup item no longer references the given chunk signature.

4. The article of claim 3, wherein the instructions to determine comprise instructions executable to:

determine that all chunks formerly referenced by the first backup item have been erased, based on a determination that there are no persistent item tags identifying the first backup item remaining in any of the at least one container index.

5. The article of claim 1, wherein the instructions comprise instructions to:

receive a request to store the first backup item as a secure item to be securely erased; and based on the request to store the first backup item as a secure item:

store, in the at least one container index, a secure flag for each chunk signature referenced by the first backup item.

6. The article of claim 5, wherein the instructions to erase comprise instructions executable to:

in response to the request to erase the first backup item, for each chunk referenced exclusively by the first backup item:

when the chunk is represented by a chunk signature having an associated secure flag in the at least one container index, perform a secure erase procedure to erase the chunk.

7. The article of claim 1, wherein each container index includes a chunk signature entry for each chunk signature it contains; and wherein the instructions to erase comprise instructions executable to:

in response to the request to erase the first backup item, for each chunk referenced exclusively by the first backup item:

erase the chunk; and remove, from the at least one container index, the chunk signature entry including the chunk signature that represents the chunk, the chunk signature entry further including at least one persistent item tag corresponding to the chunk signature; and erase, from the deduplication store, a manifest for the first backup item, the manifest including a list of the chunk signatures that represent chunks that make up a data stream represented by the first backup item.

8. A computing device comprising:

at least one processing resource; and at least one non-transitory machine-readable storage medium comprising instructions executable by at least one processing resource to:

store chunks of data in at least one container of a deduplication store;

store in at least one container index:

chunk signatures representing the chunks;

location data for the chunks;

a secure flag for each chunk signature referenced by a first backup item of a plurality of backup items of the deduplication store, based on a request to store the first backup item as a secure item to be securely erased; and for each chunk signature, at least one persistent item tag each corresponding to the chunk signature and identifying a respective backup item of the deduplication store that references or formerly referenced the chunk signature;

in response to a request to erase the first backup item and based on the secure flags, perform a secure erase procedure on each chunk referenced exclusively by the first backup item;

after some of the remaining chunks referenced by the backup items are erased, determine, based on the persistent item tags in the at least one container index, that all chunks formerly referenced by the first backup item have been securely erased; and in response to the determination, output an indication that the first backup item has been securely erased.

9. The computing device of claim 8, wherein each persistent item tag remains associated with the corresponding chunk signature until the corresponding chunk signature is removed from the at least one container index.

10. The computing device of claim 8, the instructions comprising instructions executable to:

determine second chunk signatures for a second backup item based on chunks of data for the second backup item, the second backup item to be stored in the deduplication store as a secure item for which at least some of the chunks are to be securely erased;

compare the second chunk signatures for the second backup item to the chunk signatures stored in the at least one container index;

for each of the second chunk signatures having an identical chunk signature stored in the at least one container index:

determine that the second chunk signature matches the identical chunk signature when the identical chunk signature has a secure flag.

11. The computing device of claim 10, the instructions comprising instructions executable to:

in response to a determination that the second chunk signature matches the identical chunk signature, in the at least one container index:

increase a reference count of the identical chunk signature; and add a persistent item tag corresponding to the identical chunk signature and identifying the second backup item.

12. The computing device of claim 10, the instructions comprising instructions executable to:
for each of the second chunk signatures having an identical chunk signature stored in the at least one container index:
determine that the second chunk signature does not match the identical chunk signature when the identical chunk signature does not have a secure flag.

13. The computing device of claim 12, the instructions comprising instructions executable to:
in response to a determination that the second chunk signature does not match the identical chunk signature based on the lack of a secure flag:
create a new container index to store the second chunk signature with a secure flag and a persistent item tag identifying the second backup item.

14. The computing device of claim 10, the instructions comprising instructions executable to:
for each of the second chunk signatures having an identical chunk signature stored in the at least one container index:
determine that the second chunk signature does not match the identical chunk when the identical chunk signature does not have a secure flag and based on an amount of the chunks of the second backup item requested to be securely erased.

15. The computing device of claim 10, the instructions comprising instructions executable to:
for a given one of the at least one container index, determine a sorted order for the chunk signatures of the given container index based on:
the presence or absence of a secure flag for each chunk signature; and
each persistent item tag for each chunk signature; and
reorder the chunks in a given one of the containers based on the determined sorted order for the chunk signatures, the chunk signatures of the given container index representing the chunks of the given container.

16. A method of a computing device, the method comprising:
with at least one processing resource of a computing device, storing chunks of data in at least one container of a deduplication store, the container stored in persistent storage of the computing device;
storing in at least one container index:
chunk signatures and chunk location data for each of the chunks; and
for each chunk signature, at least one persistent item tag each corresponding to the chunk signature and identifying a respective backup item of the deduplication store that references or formerly referenced the corresponding chunk signature, wherein each persistent item tag is to remain with the corresponding chunk signature until the corresponding chunk signature is removed from the at least one container index;
in response to a request to erase a given backup item of the backup items, erasing each chunk and chunk signature referenced exclusively by the given backup item;
after erasing chunks and chunk signatures of one or more other backup items of the backup items, determining, based on the persistent item tags in the at least one container index, that all chunks formerly referenced by the given backup item have been erased; and
in response to the determination, outputting an indication that the given backup item has been erased.

17. The method of claim 16, further comprising:
storing, in the at least one container index, a secure flag for each chunk signature referenced by a backup item of the deduplication store requested to be stored as a secure item to be securely erased; and
wherein the erasing comprises performing a secure erase procedure for each chunk represented by a chunk signature having a secure flag.

18. The method of claim 16, comprising, in response to the request to erase the given backup item:
storing a list of each of the at least one container index containing a chunk signature referenced by any manifest of the given backup item;
in the at least one container index, decrementing a reference count for each chunk signature referenced by any manifest of the given backup item;
after the decrementing, for each chunk signature entry having a reference count of zero, erasing the chunk signature entry and the chunk represented by the chunk signature of that chunk signature entry, each of the chunk signature entries comprising one of the chunk signatures, a respective reference count, and one or more persistent item tags;
erasing each manifest of the given backup item; and
outputting an indication that all information exclusive to the given backup item has been erased.

19. The method of claim 18, wherein:
after erasing each chunk signature entry having a reference count of zero, at least one persistent item tag identifying the given backup item remaining in the at least one container index; and
the erasing the chunks and the chunk signatures of the one or more other backup items comprises:
erasing chunk signature entries for the chunk signatures of the one or more other backup items, including each of the remaining at least one persistent item tag identifying the given backup item.

* * * * *